US008766770B2

(12) United States Patent
Bassali

(10) Patent No.: US 8,766,770 B2
(45) Date of Patent: Jul. 1, 2014

(54) UNIVERSAL TRANSCEIVERS AND SUPPLEMENTARY RECEIVERS WITH SPARSE CODING TECHNIQUE OPTION

(76) Inventor: Fred Bassali, Great Neck, NY (US)

( * ) Notice: Subject to any disclaimer, the term of this patent is extended or adjusted under 35 U.S.C. 154(b) by 34 days.

(21) Appl. No.: 13/269,705

(22) Filed: Oct. 10, 2011

(65) Prior Publication Data

US 2013/0088326 A1 Apr. 11, 2013

(51) Int. Cl.

| | |
|---|---|
| ***G05B 19/00*** | (2006.01) |
| ***B60R 25/00*** | (2013.01) |
| ***G05B 5/00*** | (2006.01) |
| ***H04L 17/02*** | (2006.01) |
| ***H04J 11/00*** | (2006.01) |

(52) U.S. Cl.
USPC .......... 340/5.64; 340/5.61; 340/5.7; 318/466; 341/176; 370/203

(58) Field of Classification Search
USPC ........................................................ 340/5.64
See application file for complete search history.

(56) References Cited

U.S. PATENT DOCUMENTS

| | | | | |
|---|---|---|---|---|
| 5,510,686 | A * | 4/1996 | Collier | 318/446 |
| 2005/0259723 | A1* | 11/2005 | Blanchard | 375/146 |
| 2007/0176788 | A1* | 8/2007 | Mor et al. | 340/825.72 |
| 2007/0237065 | A1* | 10/2007 | Kim et al. | 370/203 |
| 2011/0254685 | A1* | 10/2011 | Karasek et al. | 340/540 |

* cited by examiner

*Primary Examiner* — Jennifer Mehmood
*Assistant Examiner* — John Mortell
(74) *Attorney, Agent, or Firm* — Sofer & Haroun, LLP

(57) ABSTRACT

A garage door/gate opening/closing mechanism is provided that utilizes electromechanical actuation to exert force on a button or buttons of a wall switch in order to actuate a garage door, where the switch actuates a garage door opener. The electromechanical actuator is actuated by means of an electrical signal produced by a radio frequency receiver or by means of a switch.

4 Claims, 14 Drawing Sheets

UNIVERSAL TRANSCEIVERS AND SUPPLEMENTARY RECEIVERS WITH SPARSE CODING TECHNIQUE OPTION

BACKGROUND

1. Field of the Invention

The present arrangement relates to radio frequency transceivers and receivers. More particularly, the present arrangement relates to coding techniques for radio frequency transceivers and receivers.

2. Description of Related Art

Garage Door Opener (GDO) and Remote Keyless Entry (RKE) systems and car alarms utilizing RF (radio frequency) signal have been available for a few decades. In the existing technology two coding schemes of fixed code and rolling code are utilized.

The first generation of such devices utilizes fixed codes which provide a relatively low security against hacking by intruders. In a typical system, both the transmitter and the receiver utilize dip switches with typically 8 to 14 positions. By using standard lab equipment, all the possible combinations of codes and the common frequencies can be produced in a matter of seconds and illegal access to a garage or an automobile or a home can be gained instantaneously.

The second generation of GDO's or RKE systems utilizes rolling code schemes wherein in every transmission anew code which has a mathematical relationship with the previous transmitted codes is transmitted. Devices operating with rolling codes provide comparatively a better protection against unauthorized intrusions than the devices utilizing fixed codes but they are also prone to unauthorized intrusions. An individual who has a temporary access to the GDO or RKE remotes, e.g., a parking attendant cannot utilize the copied code from a rolling code device to activate a garage door or unlock a car door. However, if the code is captured, the mathematical relationship which governs the code generation eventually can determined and illegal access to a garage or an automobile can be gained, as there are already aftermarket transmitters sold which utilize rolling codes.

Furthermore, by utilizing simple equipment, hackers can gain illegal access to a garage or a car in a matter of hours as opposed to minutes due to fact that the rolling codes typically contain longer sequence of bits.

As explained bellow, both types of systems, i.e., fixed and rolling codes are vulnerable to security issues and their installation and use require significant inconveniences.

Vulnerabilities & Disadvantages of Fixed Code Systems (1) RF Generator and Counter can be Used for Unauthorized Intrusion.

An intruder can utilize a simple setup, i.e., an RF (Radio Frequency) signal generator which has pulse amplitude modulation capability in conjunction with a binary counter circuit and an antenna in order to illegally break into a garage or a vehicle. The signal generator is consecutively tuned to each of the known frequencies at a time whilst the binary counter circuit produces all the possible binary combination modulating the RF signal from the RE generator feeding the antenna. Using such an arrangement for a typical fixed code system utilizing 14 bits in a period of less than a minute any garage door can be opened or an automobile lock can be deactivated. I.e., in a 14 bit fixed code scheme, there is a combination of $2^{14}$=4096 possible codes. For a burst length of 1 mS (millisecond) which typically is required for activating a GDO, RKE or RFHE a period of 1 mS×4096=4.1 seconds is the required time for each of the commonly used frequencies. In order to go through the 10 different common frequencies for producing the 4096 different combinations of codes with the binary counter circuit only, it takes only a time period of about 41 seconds for opening a garage door or an automobile door.

(2) A Glance at the Dip Switch is Sufficient to Obtain the Code.

An intruder who has a temporary access to a GDO/RKE/RFHE transmitter unit, e.g., a parking attendant, can look at the dip switch combination and copies the code of the GDO/RKE/RFHE transmitter unit.

(3) Use of Universal/Trainable Garage Door Opener to Copy the Code.

An intruder who has a temporary access to a GDO/RKE/RFHE transmitter unit, e.g., a parking attendant, can utilize a universal (Trainable) Garage Door Opener to copy the code and frequency of the GDO/RKE/RFHE.

(4) Accessibility to the Premises Even after Expiration of the Subscription.

In parking lots of apartment building complexes or office buildings, often the tenants/parking subscribers are changed. However, after tenants leave the complex or their subscriptions to the parking expire, they could still use their fixed code/rolling code transmitters and illegitimately access the premises.

(5) Code Grabbing.

An intruder who is staying nearby the site can utilize receivers or spectrum analyzers to determine the frequency and the code.

(6) Universal Garage Door Opener Incompatibilities.

Very often a universal garage door opener cannot learn the frequency or code of an existing garage door opener. For instance, due to the very short transmission time of the code and the super heterodyne receiver in the universal garage door openers are not at the appropriate frequency window when the transmitter is transmitting. E.g., in the Canadian garage door openers, only 1-2 seconds of transmission is allowed and the user has to keep pushing the transmitter button repeatedly so that eventually the universal Garage Door Opener detects the frequency and the code. Nonetheless, in such cases, special skills are required, i.e., if the speed of pushing the transmitter button is too fast or too slow, the UGDO does not get trained.

(7) Nuisances and Inconveniences with the Add-on Receivers.

Often, when the universal garage door opener is incompatible, the user has to utilize an add-on receiver. The addition of such receiver either requires climbing a ladder and wiring or wiring to the door switch which poses safety risks of falls, electrocution or other accidents/hazards and expense and delays of hiring a professional for installation which is nuisance and significant inconvenience to the users. As the various models of door switches operate at different voltages, e.g., 28 V DC, 110 AC, 220 AC, the sellers of add-on receivers are hesitant to provide their units to average users who are lack the sufficient knowledge and experience and potentially could be subject to risks of falls and/or electrocution.

Vulnerabilities & Disadvantages of Rolling Code Systems (1) RF Generator and Counter can Break Rolling Codes.

Similar to the fixed code case as discussed above, in a rolling code system, an intruder using an RF signal generator and a binary counter circuit would still be able to produce the appropriate code and frequency after some time and illegally access entry into a garage or unlock a car door.

(2) Rolling Codes are Subject to Hacking.

Typically rolling codes are created by utilizing a digital feedback control system. Both types LFSR (Linear Feedback Shift Register) and NLFSR (Non-Linear Feedback Shift Register) are commonly used in cryptography algorithms such as those generated in rolling code systems. Systems utilizing NLFSR are known to be more resistant to cryptanalytic hacking than systems utilizing LFSR, i.e., NLFSR systems are breakable after longer periods than LFSR systems. The aftermarket transmitters which utilize rolling codes have already become available to the consumers and are currently being sold confirming that the rolling code systems are not quite as secure as it used to be perceived.

(3) One Time Access to the Garage is Sufficient to Gain Permanent Access.

In a rolling code system, a person who has a temporary access to the entrance area of the garage, e.g., a worker can easily program the receiver with his/her rolling code transmitter and illegally access the premises at later times.

(4) Difficulties Associated with Adding a New Transmitter with Roiling Codes.

Often the users would need to purchase more GDO transmitters (e.g., as a result of damage, loss or purchase of new vehicles). New transmitters are either ordered from the original equipment manufacturer or an aftermarket manufacturer or alternatively utilize universal transmitters capable of handling rolling codes which are available in some automobiles. In order to add any of such transmitters, often in order to provide the "cryptographic key" to the receiver, the receiver needs to be trained which necessitates accessing and pressing the training button located on the receiver unit while the transmitter is transmitting a signal. The receiver units are commonly mounted adjacent to the garage door opener motors which are installed at 7-10 ft above the garage floor. Accessing the receiver is required for every new transmitter/universal transmitter purchase and requires climbing a ladder by some one with sufficient technical background.

(5) Accessibility to the Premises Even after Expiration of the Subscription.

Similar to the fixed codes, in parking lots of apartment building complexes or office buildings, regularly the tenants/parking subscribers leave and are replaced with new tenants/parking subscribers. However, after tenants formally leave the complex or their subscription to the parking expires, they could still use their fixed code/rolling code transmitters and illegitimately access the premises.

(6) Code Grabbing.

An intruder who stays nearby the site can utilize receivers to determine the frequency and the code and use the hacked coding scheme to generate the subsequent codes as there are already aftermarket transmitters sold which utilize rolling codes.

(7) Universal Garage Door Opener Incompatibilities.

Often the universal garage door openers cannot be trained to produce the frequency or the rolling codes which necessitates changing the receiver or utilizing an additional receiver.

(9) Nuisances and Inconveniences with the Add-on Receivers.

Often, when the universal garage door opener is incompatible, the users utilize add-on receiver which necessitates either climbing ladders which pose safety issues such as risks of falls, electrocution or installing wires to the door switch. Both methods entail expenses and delays of hiring a professional for installation which are nuisance and inconvenience to the users.

Whereby, a superior system which the present invention embodies which can provide a higher security with more user-friendly methodology of activating and dc-activating new transmitters is necessary.

OBJECTS AND SUMMARY OF THE INVENTION

A new class of radio frequency remote control transmitter and receiver system operating with a novel coding scheme referred to as "SparseCode" is devised. In particular, anew system can be utilized in Garage Door (Gate) Openers (GDO), Universal Garage Door (Gate) Openers (UGDO), Remote Keyless Entry (RKE) systems or Radio Frequency Home Entry (RFHE) systems.

The new system can opera as either a standalone UGDO or a supplementary receiver for situations which existing UGDO's are incompatible with the receivers. Also, a transmitter built according to the new system in conjunction with a receiver, referred to as "supplementary receiver" accommodates the users who need to add more garage door opener transmitters but copies of the existing transmitters cannot be obtained or are not easily available. A supplementary receiver built according to the present invention can be utilized in conjunction with a transmitter which uses the regular (SparseCode/fixed code/rolling code).

According to a preferred embodiment of the present invention, the universal/supplementary receiver is installed over wall switch of a garage door opener by a snapping clamp mechanism and contains a mechanical actuator. When the receiver receives an activation signal from the pertinent transmitter, the built-in actuator exerts a momentary force on the button of the wall switch and subsequently the garage door is activated. This embodiment eliminates the need for any drilling, wiring or climbing a ladder which is typically necessary when programming a rolling code receiver or adding a supplementary receiver which brings about considerable inconveniences and often require use of experts.

The new coding system, i.e., "SparseCode", provides a superior security over the existing systems utilizing fixed/rolling code schemes. The frequency and code of a signal from a transmitter which transmits signals utilizing SparseCode cannot be captured by devices known as "code grabbers", Universal Garage Door Openers (UGDO) or spectrum analyzers (SA).

Devices such as Remote Keyless Entry (RKE) Transmitters, regular (single frequency) Garage Door Openers (GDO), universal Garage Door Openers (UGDO) or Radio Frequency Home Entry (RFHE) Systems with "SparseCode capability" can easily be programmed to transmit the appropriate activation codes for activating any receiver with "SparseCode" capability. The programming is simply done by key entries using only three or four keys available on the transmitters. Any transmitter with SparseCode capability can be programmed utilizable for activation of multiple devices even with different applications, e.g., GDO, RKE and RFHE receivers or even home appliances, medical, industrial applications, etc.

Programming, of a transmitter with SparseCode capability is done by entering the pertinent Identification Code (ID-CODE). After completion of programming, each ID-CODE is assigned to a key on any transmitter.

According to the present invention, there are two types of receivers with SparseCode capability, pre-programmed and programmable. In the pre-programmed system, the programming is performed at the factory, whereas, the programmable receiver is programmed by the user and it can handle various codes for various subscribers. Using a remote control or alternatively the receiver keys, the receiver is programmed by first entering a Programming Access Code (PAC) and subsequently entering the pertinent "ID-CODE". PAC provides the validation for accessing to the receiver which is used for both programming a new ID-CODE for deleting ID-CODE's of expired subscriptions.

Any transmitters with SparseCode capability, e.g., OEM transmitters, universal transmitters can be enabled by programming the ID-CODE to operate in conjunction with the universal/supplementary receiver with SparseCode capability.

The receivers with SparseCode capability utilize a new method for detection of low duty cycle data which eliminates the need for synchronizer circuits or data scrambling schemes.

BRIEF DESCRIPTION OF DRAWINGS

FIG. 11 depicts a universal transmitter with SparseCode capability implemented in a key fob;

DESCRIPTION OF THE PREFERRED EMBODIMENTS

Figure 1:
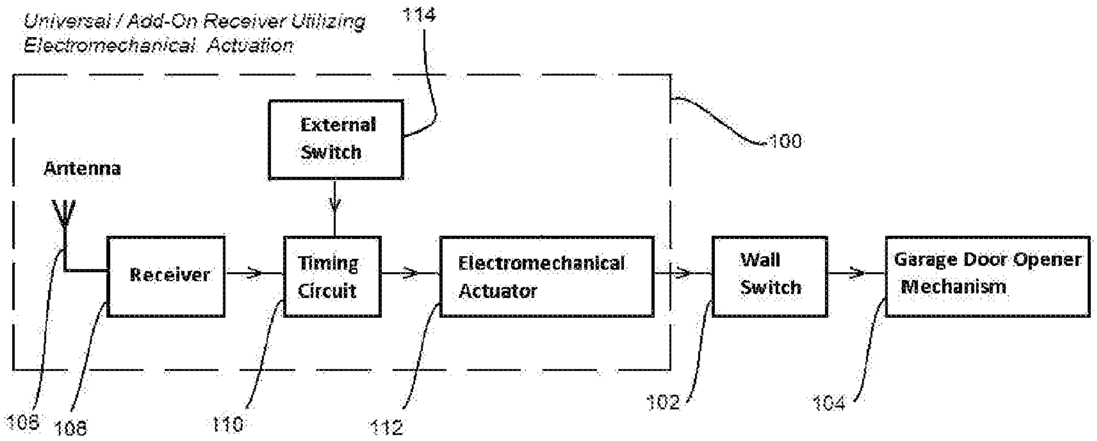
FIG. 1 depicts a block diagram for a universal/supplementary receiver which utilizes a mechanical actuation mechanism to actuate a wall switch to actuate a garage door opener, wherein the receiver is either a fixed code or sparse code type.

As described above, existing technologies, i.e., both rolling and fixed code systems suffer from security issues and significant inconveniences during the initial set up. The present invention resolves these issues. By utilizing a new coding system referred to as SparseCode the problems associated with rolling and fixed code systems are avoided. As described below, SparseCode is too fast and too short to be "grabbed" or "learned" by a UGDO or even by use of sophisticated lab instrument such as a spectrum analyzer. Furthermore, use of SparseCode provides an astronomical number of combinations of codes which practically is not reproduce-able by using a counter circuit and in conjunction with a signal generator.

As a major advantage of SparseCode systems, a transmitter with SparseCode capability can be trained to activate any receiver with SparseCode capability. The training is performed by entering an identification code (ID CODE) using the keys on the transmitter. According to this embodiment of the present invention, the only method for training the GDO/RKE/RFHE transmitters is by key entries entering 1D-CODE. The ID-CODE includes both code and frequency information (bandwidth and center frequency). Hence, according to the present invention there is no need to have a physical access to the receiver for adding the base code, "cryptographic key", which is the method used in rolling codes and necessitates climbing a ladder.

Often, there are compatibility issues when using UGDO's, e.g., they cannot detect the frequency or the code of the reference transmitter or cannot produce the proper rolling code. In such situations, when the original or a supplementary receiver SparseCode capability is utilized, addition of a new transmitter simply involves entering the pertinent ID-CODE in the transmitter.

According to another preferred embodiment of the present invention, a receiver with SparseCode capability can handle multiple ID-CODE's and is remotely accessible for programming in a new ID-CODE or deleting an old ID-CODE. This is done by first entering a Programming Access Code (PAC) which is used to allow access by the authorized person(s) to the receiver codes.

As described in below, amongst the major security advantages of systems utilizing SparseCode is the safety to hacking and illegal copying whilst the legal copying is quite simple and is done in a matter of minutes with simple key entries.

For a receiver built according to the present invention utilizing SparseCode even with the use of an RF signal generator in conjunction with a binary counter circuit and an antenna, it would take astronomical number of years to break into a garage, home or an automobile. This is mathematically demonstrated bellow that by utilizing SparseCode system provides an astronomical number of combinations of codes and consequently is virtually unbreakable.

In typical data communication systems at certain instances the duty cycle can become too low or too high. In order to avoid loss of synchronization different schemes such as data scrambling or bipolar signal are utilized but such schemes would not be appropriate in of SparseCode, as SparseCode require a low duty cycle. In the SparseCode systems however, for obtaining synchronization preambles with very low duty cycles are utilized.

According to an embodiment of the present invention a supplementary receiver is installed adjacent to or atop of garage door opener wall switch, and is interfaced with the switch instead of the existing garage door opener receiver output. Since these switches are generally installed at accessible heights, installation of supplementary receivers would not require ladder climbing. Interfacing of a supplementary receiver with the switch can be done by simply either connecting wires from supplementary receiver to the switch, or installing the supplementary receiver atop of the switch by either screwing the receiver to the wall or by utilizing the snapping mechanism which is built-in the supplementary receiver to attach to the wall switch or by utilizing another type of supplementary receiver which is installed on the wall adjacent to the garage door opener wall switch.

According to a preferred embodiment of the present invention the need for wiring is eliminated by using a snap-on overlay mechanism which mechanically activates the wall switch when needed.

Different methods can be utilized for mechanical activation of the watt switch, e.g., use of a shape memory alloy (SMA) wire/strip, an electric motor, a solenoid, a bimetal strip. However the preferred embodiment according to the present invention for producing mechanical movements is use of shape memory alloys in which by passing a current the generated heat would change the shape of the alloy resulting in the appropriate force to push the garage door switch. There are numerous types of shape memory alloys, e.g.: Ag—Cd, Au—Cd, Cu—Al—Ni, Cu—Sn, Cu—Zn, Cu—Zn—X (X=Si, Al, Sn), Mn—Cu, Fe—Mu—Si, Co—Ni—Al, Co—Ni—Ga, Ni—Fe—Ga, Ti—Pd, Ni—Ti, Ni—Mn—Ga.

One of the most commonly used shape memory alloys (SMA) is TiNi, i.e., Titanium-Nickel alloy also referred to as Nitinol. Shape memory alloys have pseudo-elastic properties of the metal during the high temperature (austenitic) phase. They can undergo large deformations in their high temperature state and then instantly revert back to their original shape when the stress is removed. As an electrical current is passed through an SMA wire or an SMA strip heat is generated, the austenitic state of changes to martensitic state causing the desired effect, e.g., shrinkage, bending etc. This criterion is utilized in the present invention as a preferred choice for the implementation of an actuator. In an overlay enclosure added on top of a garage door opener switch a SMA strip/wire is used to create movement to press a garage door opener switch.

FIG. 1 depicts a possible implementation of a block diagram for universal/supplementary receiver 100 according to the present invention. Antenna 106 couples the radio frequency signal to a fixed code receiver or SparseCode receiver 108. Upon reception of activation signal, receiver 108 in turn produces a signal activating timing circuit 110 which produces a high current/voltage state for a short period of time, e.g., 1 second to activate a electromechanical actuator 112 which in turn produces movements of a lever in order to exert force on the button 103 of wall switch 102, Electromechanical actuator can be composed of an electromagnet, or an electric motor producing a linear movement or a rotary motor such as a step motor or a system utilizing SMA wires/strips or bimetal strips or any other type of electromechanical actuation. Since wall switch 102 is covered by the universal/supplementary receiver 100 housing, universal/supplementary receiver 100 is equipped with external switch 114 which functions as a substitute for wall switch. Upon a momentary push of external switch 114, a high current/voltage state for a short period of time, e.g., 1 second is generated in order to activate electromechanical actuator 112 which in turn produces movements of a lever to exert force on the button 103 of wall switch 102.

Figure 2:
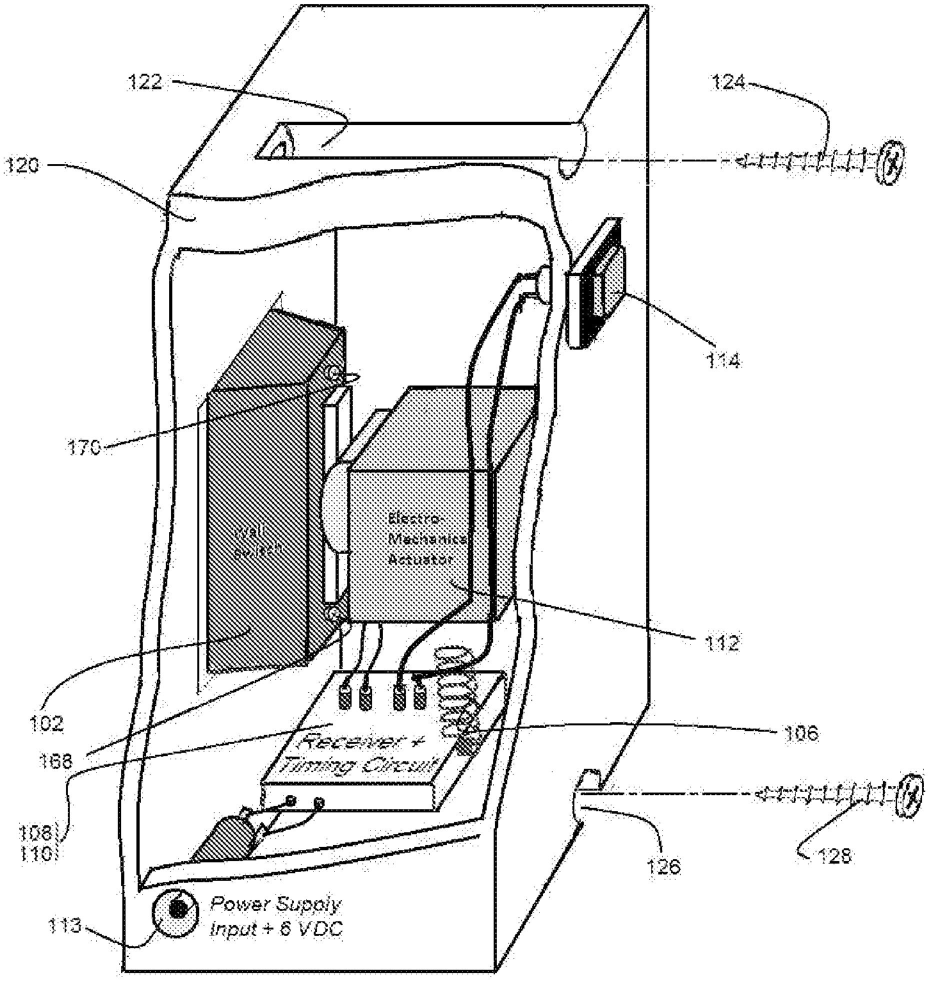
FIG. 2 depicts a possible mechanical implementation of the block diagram depicted in FIG. 1.

FIG. 2 depicts a physical implementation for the block diagram of FIG. 1. An overlay enclosure 120 is utilized which includes an opening to accommodate protrusion of standard wall switches commonly available in the market into the enclosure 120. According to FIG. 2, wall switch 102 is secured to the wall via two screws 168 and 170. The overlay enclosure 120 is secured to the wall by utilizing screws 124 and 128 utilizing built-in screw slots 12 and 126 in hosing. As a preferred choice for antenna, a spiral antenna 106 is utilized in the depiction of FIG. 2 which couples the RF signal to receiver 108 which provides an output to timing circuit 110. A pair of wires connects the output of the timing circuit 110 to electromechanical actuator 112. Upon receiving an activation signal, a high current/voltage state is generated for a short period of time, e.g., 1 second to activate an electromechanical actuator 112 which in turn produces movements of a lever and exerts force on the button 103 of wall switch 102. Universal/supplementary receiver 100 is powered via an external AC to DC power supply which is plugged into an outlet. The external power supply is connected to universal/supplementary receiver 100 via a connector 113 on the side wall of enclosure 120.

Figure 3:
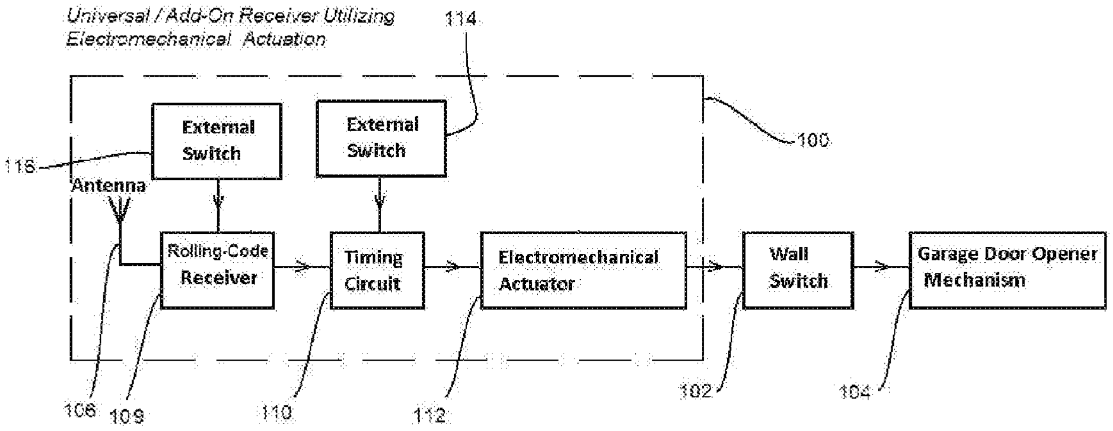
FIG. 3 depicts a block diagram for an universal/supplementary receiver which utilizes a mechanical actuation mechanism to actuate a wall switch to actuate a garage door opener, wherein the receiver is a rolling code type and contains an extra switch for the learn function in the rolling code receiver.

FIG. 3 depicts a possible implementation of a block diagram for universal/supplementary receiver 100. Antenna 106 couples the radio frequency signal to a rolling code receiver 109. Upon reception of activation signal, receiver 109 in turn produces a signal activating timing circuit 110 which produces a high current/voltage state for a short period of time, e.g., 1 second to activate electromechanical actuator 112 which in turn produces movements of a lever in order to exert force on the button 103 of wall switch 102. Since wall switch 102 is covered by the universal/supplementary receiver 100 housing, the wall switch is not accessible. Hence universal/supplementary receiver 100 is equipped with external switch 114 which functions as a substitute for wall switch. Upon a momentary push of external switch 114, a high current/voltage state for a short period of time, e.g., 1 second to activate an electromechanical actuator 112 which in turn produces movements of a lever in order to exert force on the button 103 of wall switch 102. External switch 116 is connected to rolling code receiver 109 and is utilized as the means for alerting the receiver 109 for the learn function which is typically used in rolling code receivers during training procedures.

Figure 4:
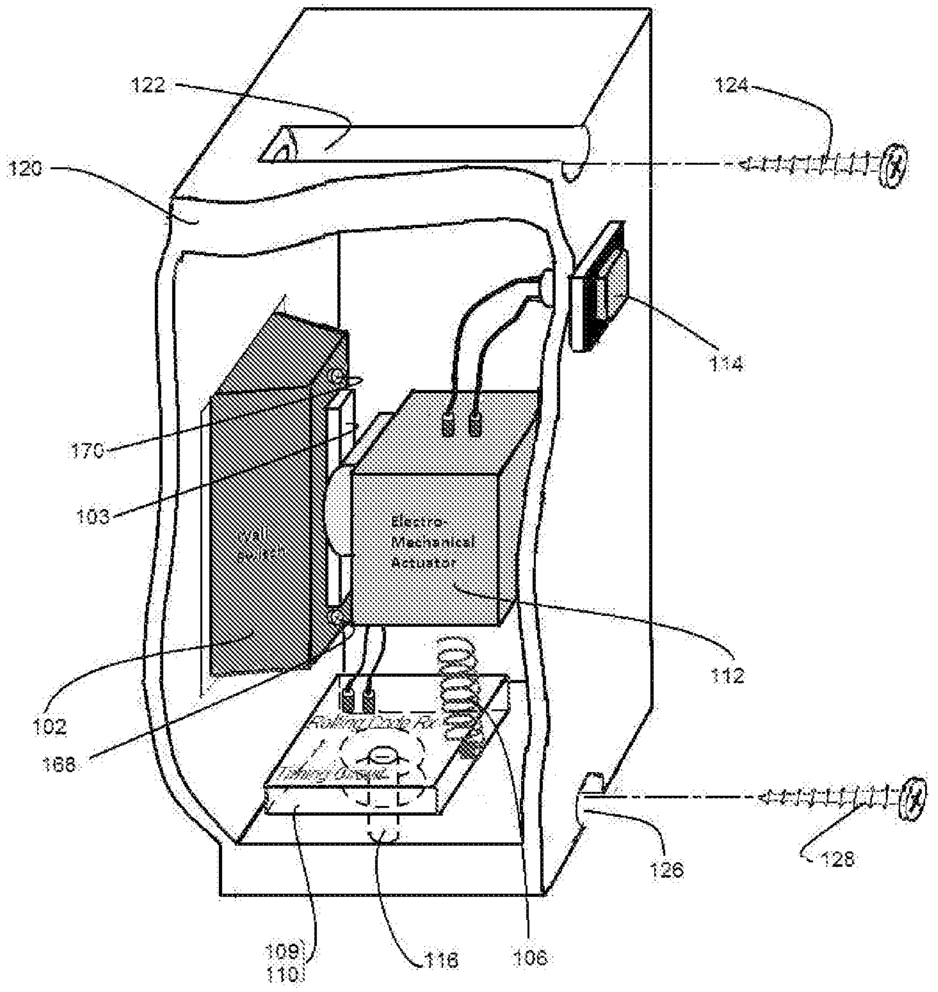
FIG. 4 depicts a possible mechanical realization of the block diagram depicted in FIG. 3 wherein the rolling code learn button is located on the bottom of the housing for the receiver.

FIG. 4 depicts a possible physical implementation for the block diagram of FIG. 3. Overlay enclosure 120 includes an opening to accommodate protrusion of standard wall switches commonly available in the market into the enclosure 120. According to FIG. 4, wall switch 102 is secured to the wall by means of screws 168 and 170. Overlay enclosure 120 is independent of wall switch 102 is secured to the wall by means of screws 124 and 128 wherein screw slots 122 and 126 are utilized in housing 120 in order to contain screws. As a possible choice for antenna, spiral antenna 106 is utilized and couples the RF signal to rolling code receiver 109 and timing circuit 110 respectively. A pair of wires connects the output of timing circuit 110 to electromechanical actuator 112. Upon receiving an activation signal, timing circuit 110 generates a high current/voltage state for a short period of time, e.g., 1 second which in turn activates electromechanical actuator 112 which subsequently produces movements of a lever in order to exert force on the button 103 of wall switch 102 which in turn activates the garage door. Universal/supplementary receiver 100 is powered via an external AC to DC power supply which is plugged into an electrical outlet. The external power supply is connected to universal/supplementary receiver 100 via a connector 113 on the side wall of enclosure 120. External switch 116 located on the bottom portion of housing 120 is connected to and engaged with rolling code receiver 109. External switch 116 is utilized as the means for activating the learn function of receiver 109 such activation is typically necessary when a rolling code receiver learns the base code (cryptographic key) of a rolling code transmitter, "cryptographic key", during the training procedures.

Figure 5:
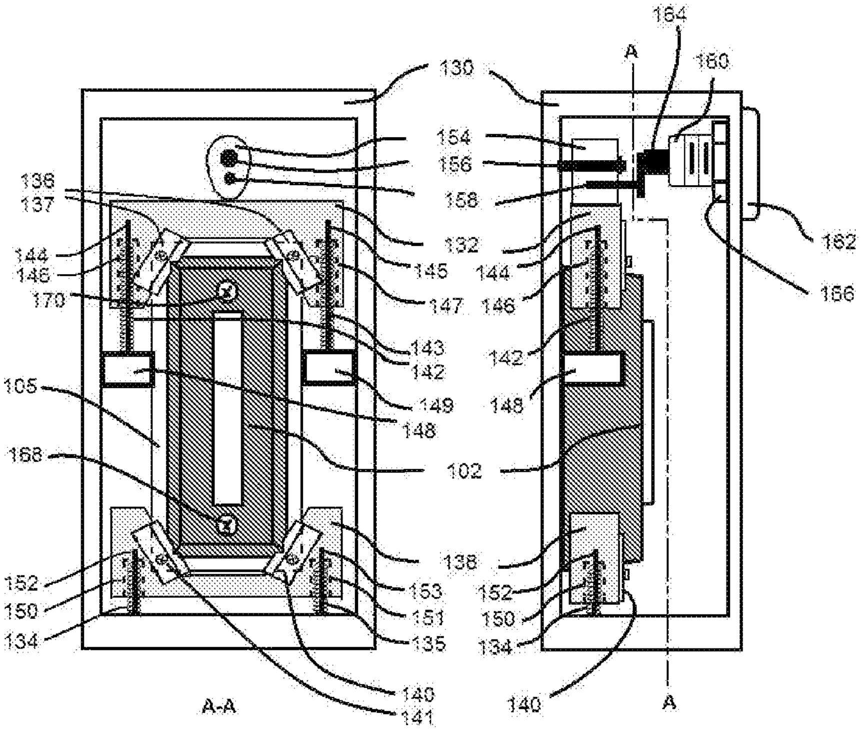
FIG. 5 depicts a possible implementation for connecting the universal/supplementary receiver to a wall switch in which use of screws for installation is not required wherein bracing jaws are utilized for snapping on the wall switch.

FIG. 5 depicts the front and side view sections for a possible implementations of clamping system used for attaching a universal/supplementary receiver to garage door opener wall switch 102. According to this preferred embodiment of the present invention, there is no need to drill any holes for installing the universal/supplementary receiver Housing 130 includes a rectangular opening 105 which is slightly larger than the rectangle in the back of standard garage door opener wall switches used in the industry. For non standard switches, user can replace it with a common wall switch type or add a parallel standard. Alternatively the user can utilize the type of receiver which is mounted adjacent to the wall switch depicted in FIG. 7 which is described below. In the course of installation opening 105 in universal supplementary receiver unit is placed around the garage door opener wall switch 102 and the housing is pushed against the wall. By pushing a lever with a linear or a rotational mechanism, a clamping mechanism snaps onto the wall switch by scoring superficial cut into the switch. According to the implementation depicted in FIG. 5, two pairs of blades are used to score and penetrate into the four corners of wall switch 102. Blade pairs 136, 137 are attached diagonally to the top jaw 132. Similarly, blade pairs 140, 141 are attached diagonally to the top bottom jaws 138. The movements of jaws 136 and 138 are regulated by railing and spring loaded mechanisms so that when universal/supplementary receiver is snapped on the wall switch 102, the bottom jaws 138 provides the adequate force utilizing spring loading. Pair of rods 144, 145 functions as guide rails and partially are protruded into the lateral portions of jaw 132, The other ends of the rods 144 are secured into pair of support flanges 148. A pair of springs 142, 143 partially encompasses rods 142, 143 and is extended from flanges 142, 143 into top jaw 132. Similarly, pair of rods 152, 153 functions as guide rails which are partially protruded into the bottom of lateral portions of jaw 138. The other ends of the rods are secured into housing 130. A pair of springs 134, 135 encompasses rods 152, 153 and extends from housing 130 from the bottom into mid jaw 138. Spring pairs 134, 135 are partially extended into holes 150, 151 located laterally in jaw 138. As a result, the bottom jaw is spring loaded to housing 130. In an alternative configuration bottom jaw 138 can be affixed to housing 130 and only top jaw 132 can be spring loaded.

Installation of the described universal/supplementary receiver via use of the clamping mechanism can be done by an individual without expertise or special skills, opening 105 of the housing 130 of universal/supplementary receiver 100 is placed around wall switch 102 and moved towards the wall until firmly touches the wall. Subsequently user moves/turns the snapping mechanism. According to implementation of FIG. 5, the snapping mechanism utilizes a rotational method utilizing a rotational element 160 which is secured to the housing via a bolt 162. Rotational axle 164, is turned by rotational element 160 connected to an off-axis rod 158 which protrudes into an off axis hole in cam 154. Cam 154 is installed to the housing 130 via axle 156. As a result of turning of rotational element 164, cam 154 is turned around its axis which in turn pushes jaws 132 downward and subsequently blade pairs 136 and 140 score into the four corners of the wall switch 102. In FIG. 5, element labeled 160 represents either a lock cylinder or other means of providing a rotational movement. When a lock mechanism is utilized a key is inserted into lock cylinder 160 and subsequently the key is turned to a lock position.

Depiction of FIG. 5 represents a possible scheme for attaching a universal/supplementary receiver to a Garage Door Opener wall switch wherein 4 blades score into the wall switch. However, other schemes using similar concept are possible and are within the scope of the present invention, i.e., either by using blades, or using other types of sharp edges or sharp points or other means for clamping on the wall switch are possible.

Another approach is electrical activation of the clamping mechanism. One possible approach an electric motor/electromechanical actuator coupled to the locking mechanism. Alternatively scoring into the wall switch by means of utilizing heated wires (such as SMA wires) can be utilized as the means for attaching of the housing of the receiver to the wall switch. A possible implementation could be by passing an electrical current through SMA (e.g., Nitinol) wire, as the temperature of the wire increases to near or above the melting point of the plastic used for the wall switch at the same time as the SMA wire shrinks in length as a result of heat, the SMA wire superficially enters into the wall switch, Metal sheets can subsequently enter in the scored space as further support. Electrical activation of the clamping mechanism can be accomplished by means of pressing a button or using a key in a lock which is connected to an electrical switch.

Alternatively, non-sharp objects such as surfaces with high friction index, e.g., rubbers, rough surface such as sandpapers or alike, glues/epoxies, Velcro, suction cups or heated surfaces can be utilized as a part of a clamping process. Other possible approaches are screwing or gluing the universal/supplementary receiver to the wall switch or the wall.

Figure 6:
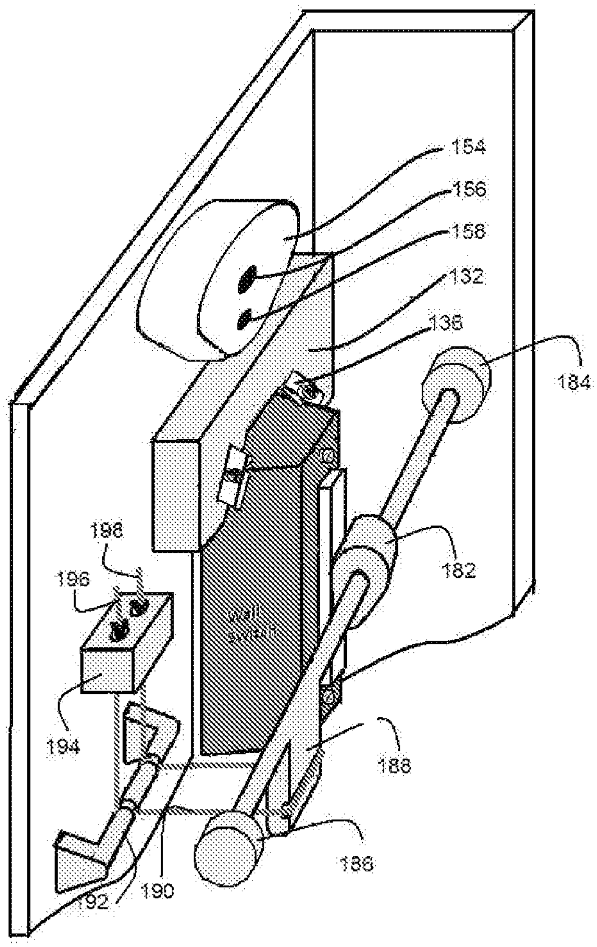
FIG. 6 is a depiction of a dissected possible mechanical realization of the block diagram depicted in FIGS. 1 and 4 wherein by utilizing a cam shaft and shape memory alloy wires to implement a tow profile universal/supplementary receiver.

FIG. 6 depicts a dissected (bottom jaw is not shown) image of a low profile electromechanical actuator implementation of the present invention using a shape memory alloy (SMA). Garage door opener wall switch 102 is pre-installed on a wall using screws 168 and 170 and is wired to a garage door opener mechanism. The electromechanical actuator mechanism is composed of cam shaft 180 secured in bushings 184 and 186 each attached to a side wall of the housing for universal/supplementary receiver. Cam shaft 180 includes a shaft and other components, i.e., cam 182, tab 188 and tab 202. Torsion spring 200 is secured on one of the far ends of cam shaft 180 and is inserted in a hole 204 located in bushing 184 and is wound against tab 202. A mild spring loading function is obtained by use of torsion spring 202, as a result normally cam 182 is kept away from wall switch 102 and cam shaft 180 is pressed counterclockwise. Tab 188 is located at the other side of cam shaft 180 close to busing 186. Tab 188 contains a groove to contain part of SMA wire 190. SMA wire 190 is guided via a guiding mechanism 192 so that SMA wire 190 extends upward and as a result extra lengths of SMA wire length is utilized and consequently sufficient wire displacement is obtained during the activation. The two ends of SMA wire 190, labeled 196 and 198, are secured in holes located in flange 194 attached to the housing of universal/supplementary receiver. SMA wire ends 196 and 198 are connected to the pertinent timing circuit (not shown). Upon activation of universal/supplementary receiver, the pertinent timing circuit produces an electrical current pulse which passes through SMA wire 190, which produces heat in SMA wire 190 resulting in shrinkage of SMA wire 190 and in turn tab 186 moves towards the wall and cam 182 presses button 103 of the garage door opener wall switch 102 garage door opener mechanism activates.

Figure 7:
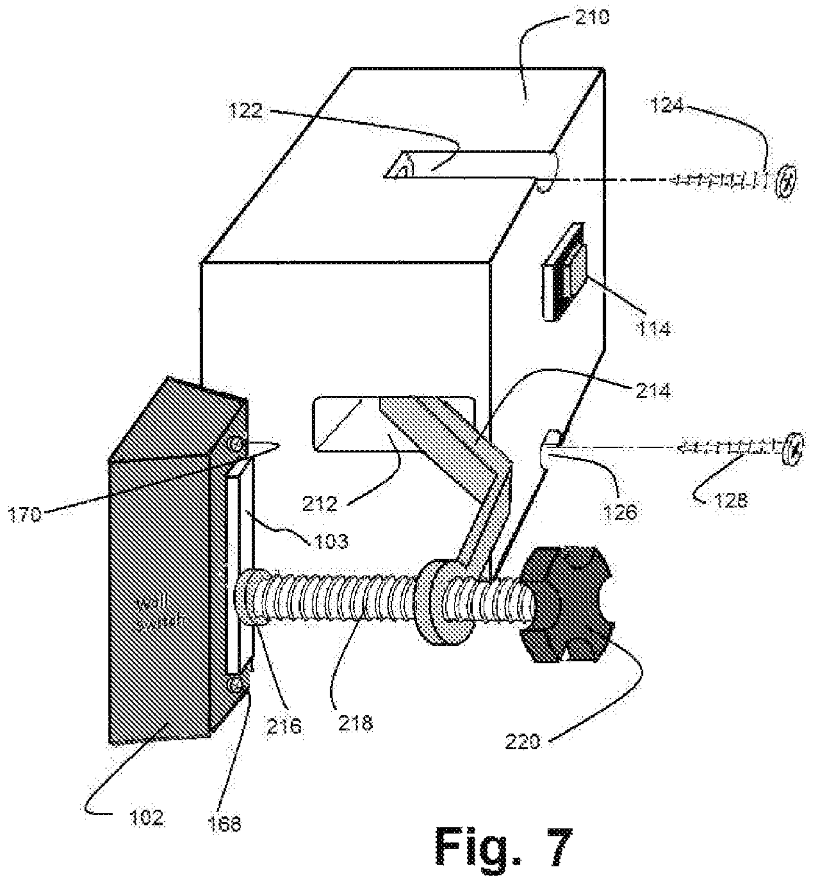
FIG. 7 depicts an alternative possible mechanical realization of the block diagram depicted in FIGS. 1 and 4 wherein the receiver is installed adjacent to a wall switch.

FIG. 7 depicts a possible method for an alternative type of a universal/supplementary receiver constructed according to the present invention wherein the receiver is installed adjacent to a wall switch. This embodiment represents another possible mechanical implementation of the block diagram depicted in FIGS. 1 and 3 wherein the receiver is installed adjacent to a wall switch.

In this embodiment a lever extending out from an electromechanical actuator located in a receiver housing is used to activate the wall switch. The receiver housing is installed at a certain distance from a wall switch such that the extension of the arm can interact with the button on the wall switch.

As depicted in FIG. 7, wall switch 102 is secured to the wall by means of screws 168 and 170 and enclosure 210 is independently secured to the wall by means of screws 124 and 128, Screw slots 122 and 126 are utilized in housing 210 for containing screws 124 and 128. Enclosure 210 includes an opening 212 to accommodate lever 214 extending outside of enclosure 210. Tip of lever 214 has a screw hole which accommodates threaded piston 218. Cylindrical pad 216 which preferably is made of soft material such as rubber or plastic is connected to threaded piston 218. Knob 220 is attached at the other end of threaded piston 218. The choice of where enclosure 210 is installed on the wall is made based on aligning cylindrical pad 216 above button 103 of the garage door opener wall switch 102. By turning knob 220 the cylindrical pad 216 is brought close to button 103 of the garage door opener wall switch 102. Upon activation of receiver enclosed in housing 120, the built-in electromechanical mechanism provides the proper movement of lever 214 which in turn cylindrical pad 216 presses button 103 of the garage door opener wall switch 102. Universal/supplementary receiver depicted in FIG. 7 is equipped with external switch 114 which functions as a substitute for wall switch. Upon a momentary push of external switch 114 the built-in electromechanical mechanism provides the proper movement of lever 214 which in turn cylindrical pad 216 presses button 103 of the garage door opener wall switch 102.

Another embodiment of the present invention is a transmitter capable generating a novel coding scheme of data transmission referred to as "SparseCode" and a receiver capable of deciphering SparseCode. The advantage use of SparseCode is its security and ease programming any transmitter with SparseCode capability. Different devices can be built to function as universal transmitter (UT), with SparseCode capability, e.g., universal garage door openers (UGDO), remote keyless entry (RKE), and radio frequency home entry systems (RFHE).

There are gate or garage door opener switchers which incorporate two or three buttons for different operations, i.e., open, close and stop. In such a situation two or three universal receivers such as receiver of FIG. 7 can be utilized. Alternatively, a receiver incorporating double triple actuator similar to depictions of FIGS. 2, 4, 5, 6 and 7 can be utilized.

Figure 8:
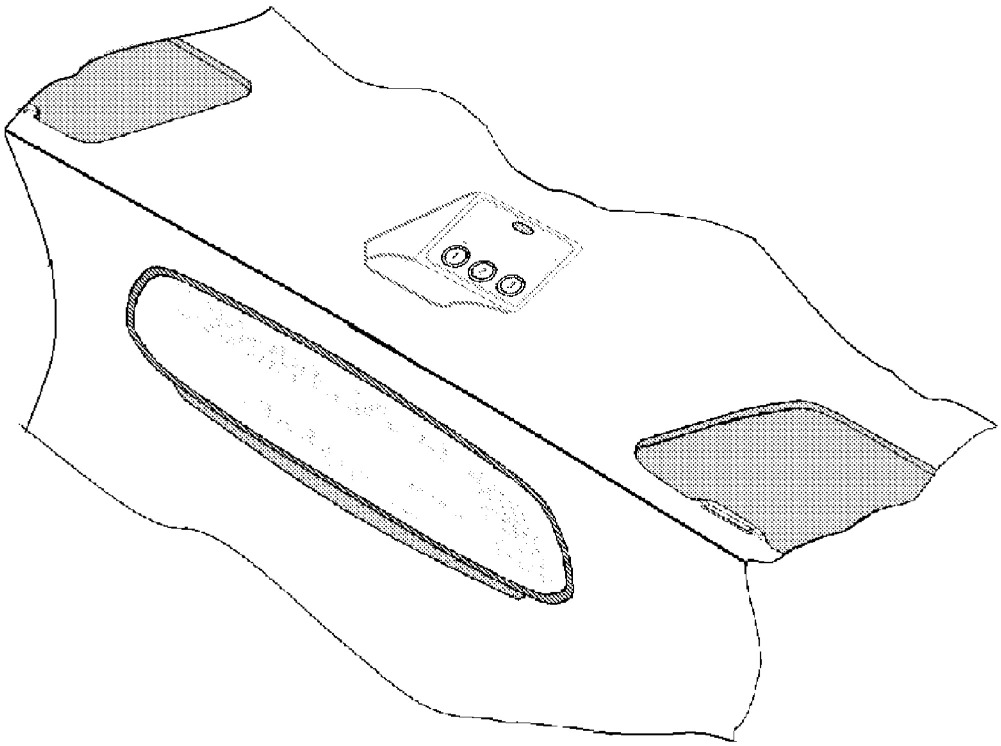
FIG. 8 depicts a universal transmitter with SparseCode capability implemented in an overhead consol.

FIG. 8 depicts a universal transmitter/with SparseCode capability implemented in an overhead console wherein only three buttons are available to the user. Such a universal transmitter can be utilized a garage door opener and/or radio frequency home entry systems and/or appliance controls. An LED is available for the normal operation of the universal transmitter as well as aiding the user during programming the SparseCode.

Figure 9:
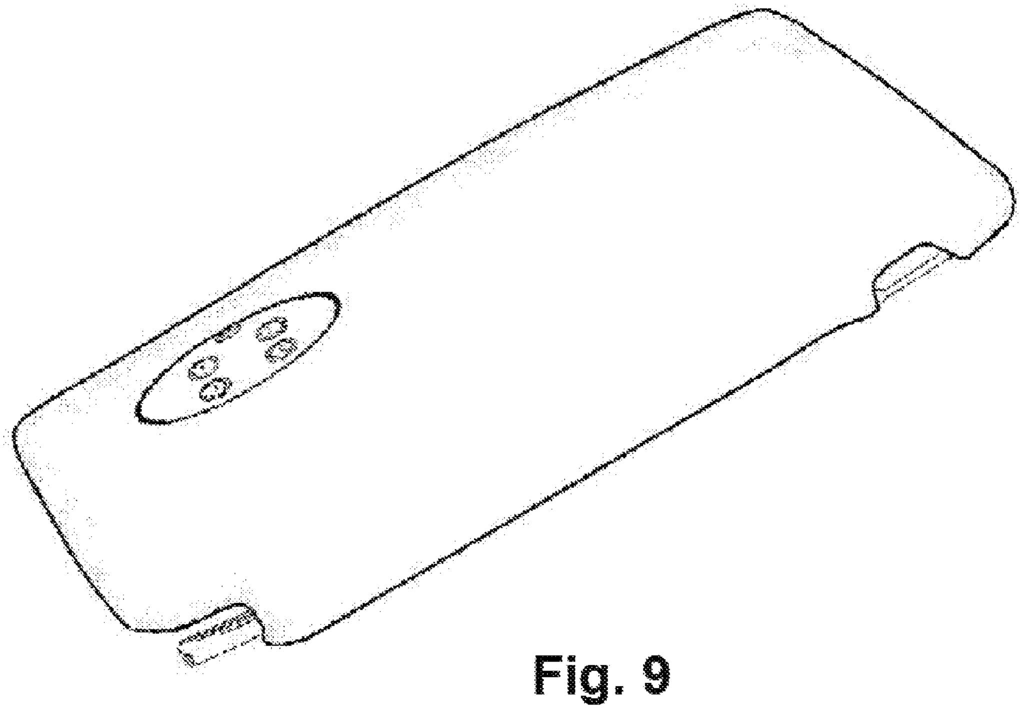
FIG. 9 depicts a universal transmitter with SparseCode capability implemented in a visor.

FIG. 9 depicts a universal transmitter with SparseCode capability implemented in a visor wherein 4 keys are available to the user. An LED is available for the normal operation of the universal transmitter as well as aiding the user during programming the SparseCode.

Figure 10:
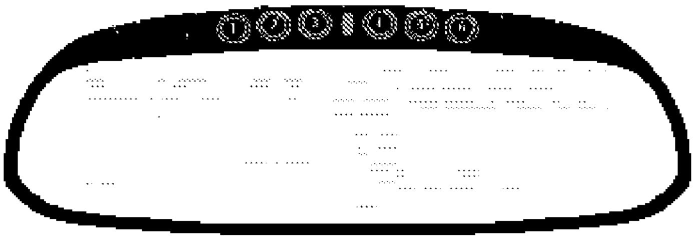
FIG. 10 depicts a universal transmitter with SparseCode capability implemented in a rear view mirror.

FIG. 10 depicts a universal transmitter with SparseCode capability implemented in a rear view mirror wherein 6 keys are available to the user. An LED is available for the normal operation of the universal transmitter as well as aiding the user during programming the SparseCode.

Figure 11:
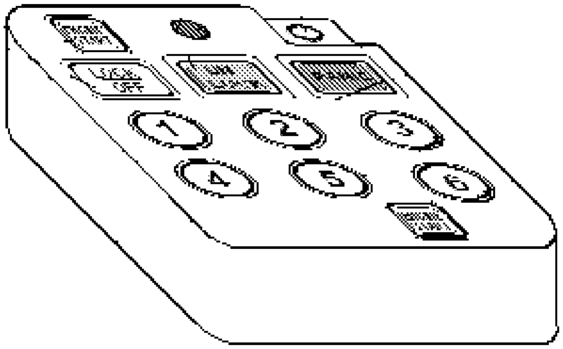
FIG. 11 depicts a universal transmitter with SparseCode capability implemented in a fob.

FIG. 11 depicts a universal transmitter with SparseCode capability implemented in a fob wherein 6 keys are available to the user. An LED is available for the normal operation of the universal transmitter as well as aiding the user during programming the SparseCode.

Figure 12:
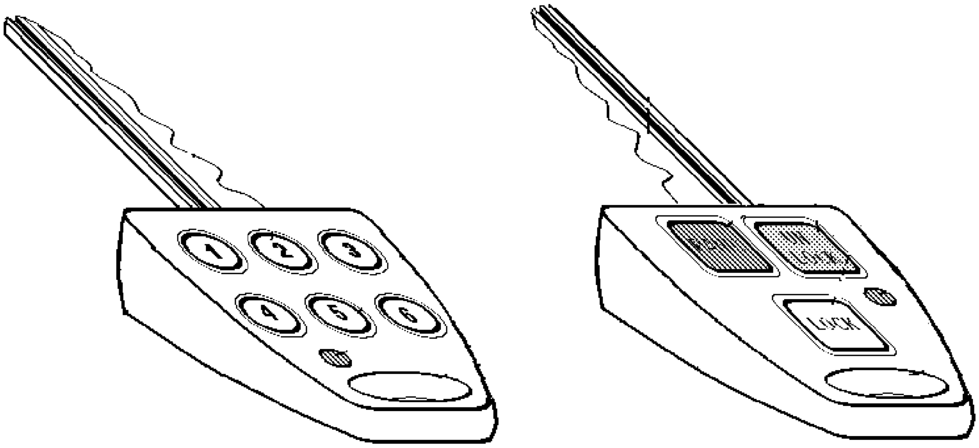
FIG. 12 is a depiction of the format of a word generated by a transmitter utilizing SparseCode.

FIG. 12 depicts a universal transmitter with SparseCode capability implemented in a key fob. One side of the key fob contains the common keys typically used for remote keyless entry functions. On the second side 6 keys and an LED are available to the user for SparseCode capability.

Means of Generating and Detecting SparseCode

As discussed above, user of rolling codes and fixed codes for garage door openers and remote keyless entry systems are faced with difficulties in their initial setup, training universal transmitters, adding new transmitters and various security issues. The system constructed according to the present invention, however, utilizes special hardware to generate a signal (referred to as "SparseCode") which cannot be hacked or copied as it utilizes an exceedingly low duty cycle and short pulse widths. As a result the carrier cannot be detected and effectively makes the system invulnerable from the signal getting copied by unmatched any receiver. A user of the devices constructed according to the present invention has the ability to enter the pertinent code by key entries on of the transmitter (rather than pressing the learn key of the receiver in the rolling code system which necessitates climbing a ladder). The presence thermal (Johnson) noise in receivers (Noise Power=kTB, where k is the Boltzmann's constant, T is the temperature in Kelvin and B is the receiver Bandwidth) is unavoidable and necessitates matched bandwidth to pulse width of data, however, slight increase or decrease in bandwidth or center frequency produces excessive ISI (Inter-Symbol Interference). Thereby for the present invention only a matched receiver can detect the presence of signal transmitted. On the other hand, if an unmatched receiver with excessive bandwidth, including a spectrum analyzer (which is effectively a receiver with a sweeping local oscillator with a constant unmatched bandwidth) is used, the received signal would be buried in thermal noise. Only a matched receiver, i.e., a receiver with a posteriori intelligence of bandwidth, pulse width, frequency and coding scheme.

SparseCode generated by a transmitter according to the present invention has a typically some but not necessarily all of characteristics as follows:

(1) Small duty cycle (typically <0.5%), a duty cycle of higher than 0.5% could be utilized, however, it would be more vulnerable to hacking.

(2) Short pulse widths ranging from a few to several microseconds.

(3) The data is subdivided into several groups, e.g., 4 groups.

(4) Each data group is preceded with a unique preamble.

(5) The data and preambles are designed so that two or more consecutive highs are avoided.

(6) Frequencies of for different devices are not unique.

(7) Pulse widths and consequently receiver bandwidths for different devices are different.

(8) The carrier signal level is selected so that the signal to noise ratio at the receiver is sufficiently low not detectable with an unmatched receiver. According to a preferred embodiment, the carrier frequencies of each burst are different.

Utilization of the described characteristics when the transmitter operates at low power results in a low signal to noise ratio at the receiver which requires a matched receiver as the signal characteristics cannot be detected with any sweeping Superheterodyne circuitry due to both time and frequency ambiguities, and incidental FM. I.e., the RF energy is only present for an extremely short period of time in comparison to the sweep scan time of the universal (trainable) garage door openers or spectrum analyzers, and the resolution bandwidth of the universal (trainable) garage door openers or spectrum analyzers practically would not match with the data which in turn results in ISI and signal spread in both frequency and time which generates excessive ambiguity for an unmatched detection mechanism. Even if the sweep time of a super-heterodyne trainable garage door opener was to be shortened, the signals transmitted from a transmitter built according to the present invention would not be detectable due to incidental FM. When the sweep time is reduced, the sweep speed increases and consequently the sweep signal would include abundance of "incidental FM" signals effectively an FM signal with high index of modulation composed of numerous sidebands wherein the main carrier is no longer clearly identifiable. The numerous sidebands would interfere with the signal detection process and impede the frequency identification in the spectrum analyzers or super-heterodyne universal garage door openers.

As discussed above SparseCode includes a preamble and data which serves as the means for signaling the receiver to synchronize with the upcoming data. As a result, repeated bit stream for data synchronization is not necessary and the receiver would respond to the first transmission. Generation of certain data which could be confused as preamble is avoided in order to avoid erroneous synchronizations. This could be accomplished in different fashions. One possible way is to make the preamble bits with certain spacing different than those of data bits. Another method is by avoiding the codes which would result in data stream identical to the preamble.

According the present invention making a legitimate copy of a GDO/RKE/RFHE transmitter can be done by the owner or an authorized person who is given the pertinent "training code", ID-CODE, e.g., a 25-digit number composed of the four digits 1, 2, 3 and 4. In the three button style transmitters, however, two key can be pressed simultaneously to represent the fourth key, e.g., when the keys 1 and 3 are pressed simultaneously correspond to the 4 key.

The training of the transmitter is performed by entering "ID-CODE" via the keys on the GDO/RKE/RFHE transmitters. The "ID-CODE" contains both frequency and code information. In a preferred embodiment according to the present invention, the combination of single key and double key entries are utilized which increase the possible number of symbols. A double key entry is composed of simultaneously pressing two keys. For instance according to this embodiment of the present invention, in a 4 key system when simultaneously pressing the keys "4" and "1" the resultant action would correspond to "5", similarly when simultaneously pressing the keys "4" and "2" the resultant action would correspond to "6", or simultaneously pressing the keys "4" and "3" the resultant action would correspond to "7".

A variety of devices systems (e.g., a regular garage door transmitter receiver, a universal transmitter or a trainable/universal garage door opener transmitter/receiver, a key fob or house key with a fob transmitter with a receiver) with SparseCode capability benefits from its features, i.e., new codes for different applications can be programmed, signals emitted from a transmitter are very secure as they cannot be copied by a super-heterodyne trainable garage door opener, spectrum analyzers. Hence, when a key fob with SparseCode is temporarily left by a non-owner (e.g., parking attendant, auto repair shop), the SparseCode cannot be illegitimately copied even when utilizing an ordinary UGDO.

A transmitter built according to the present invention utilizes SparseCode which is a sparse binary code, i.e., a long binary string with an extremely small duty cycle provides an astronomical number of possible combinations.

As a numerical example for demonstrating the merits of the SparseCode systems, a transmission time of 0.1 S and a bit rate of 400,000 bps are selected. Every stream of transmission includes (K=0.1 S×400,000 b/s) 40,000 bit slots. If a duty cycle in the range of 0.2-0.4% is selected, then for each transmission there would be between L=800 to M=1,600 bits transmitted. The possible number of combinations, N, is:

$$N = \binom{K}{L} + \dots + \binom{K}{L-i} + \dots + \binom{K}{M}$$

Utilizing the Stirling's approximation, $$n! \approx \sqrt{2\pi n}\left(\frac{n}{e}\right)^n$$

and using the SparseCode assumption, i.e., K>>L and K>>M, yield that the number of combinations N is:

$$N > \sqrt{\frac{2K}{\pi(M+L)}}\,(M-L+1)\left(\frac{2K}{M+L}\right)^{\frac{M+L}{2}}$$

For K=40,000, L=800 and M=1,600 the number of combinations:

$$N > 2.61\times10^{1830}$$

Using a setup described above to produce all the combinations ($2.61\times10^{1830}$) in order to make an illegal entry, the require time period calculates to be:

$$\frac{2.61\times10^{1830}}{(400{,}000\text{ Bits/s})\cdot(3600\text{ s/hrs})\cdot(24\text{ hrs/day})\cdot(365\text{ day/year})} = 2.08\times10^{1817}$$

years.

This demonstrates that a typical realization of SparseCode with even the limited number combinations which only includes the very short duty cycle patterns (limited in the range of 0.2-0.4%) an astronomical combination of codes are created.

The following is a possible implementation example which demonstrates functionality of a SparseCode-based system:

Bit rate=400,000 bps

Pulse width=1/400,000 bps=2.5 μS

Number keys available on the transmitter for programming=Number Base: 4

Number of base-4 digits used for ID-CODE=25

Number of groups in ID-CODE=5

Example for Key Entry for ID-CODE=43312, 22312, 21132, 33443, 24344

Conversion from Key Entry digits (1, 2, 3, 4) to base-4 digits (0, 1, 2, 3):

43312, 22312, 21132, 33443, 24344

−11111, 11111, 11111, 11111, 11111

$=32201, 11201, 10021, 22332, 13233_{(4)}$

Figure 13:
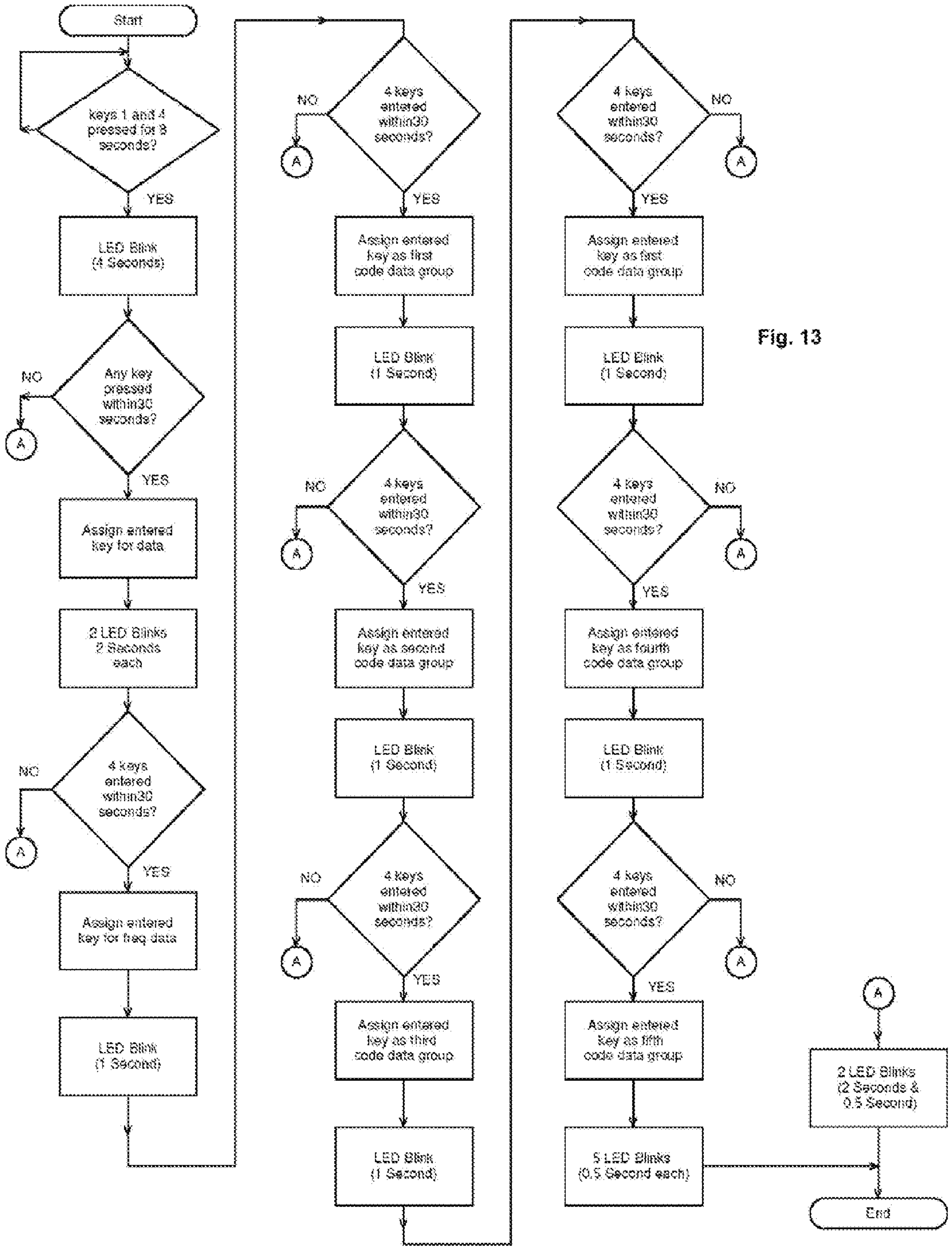
FIG. 13 depicts a possible block diagram for a SparseCode transmitter.

Subdividing 25 base-4 digits into 5 groups:

$(32201)_{(4)}=3\times4^4+2\times4^3+2\times4^2+0\times4^1+1\times4^0=(897)_{(10)}$ $(11201)_{(4)}=1\times4^4+1\times4^3+2\times4^2+0\times4^1+1\times4^0=(353)_{(10)}$ $(10021)_{(4)}=1\times4^4+0\times4^3+0\times4^2+2\times4^1+1\times4^0=(265)_{(10)}$ $(22332)_{(4)}=2\times4^4+2\times4^3+3\times4^2+3\times4^1+2\times4^0=(702)_{(10)}$ $(13233)_{(4)}=1\times4^4+3\times4^3+2\times4^2+3\times4^1+3\times4^0=(495)_{(10)}$ FIG. 13 depicts a portion of word generated by a transmitter utilizing SparseCode for the discussed example depicts a portion of word generated by a transmitter utilizing SparseCode for the discussed example (only groups 1 and 2 group of the ID-CODE are shown). Each group is composed of a preamble string followed by a data string. The strings generated in the 1st and 2nd groups are produced as a result of the 1st 10 key entries, i.e., 43312 and 22312 which correspond to 32201 and 11201 in base 4 which respectively correspond to 897 and 353 in base 10. Each of these numbers is represented in the data strings with only one high bit. The location of high bit in the data string is bit number 897 in the first data string and 353 in the second data string. I.e., the location of the only high bit in every data string is determined by the counting from the start (bit 1 after preamble) until the number corresponding to the pertinent portion of ID-CODE. This is shown in the FIG. 8 depicts a portion of word generated by a transmitter utilizing SparseCode for the discussed example, wherein the data string of group 1 bit number 897 is set to 1 and the remaining bits are all 0's. Similarly, in the data portion corresponding to group 2 only bit number 353 is set to 1 and the remaining bits are all 0's. Each of the data transmissions are preceded by a known preamble typically composed of 1000 bits. Preambles include guard legions (e.g., 50 bits on each side), i.e., a long string of 0's. The all zero guard regions are utilized in order to avoid possible occurrence of a 1 from the preamble close to a 1 from the data string.

Furthermore, in order to keep the duty cycle appropriately low (less than 0.5%), preambles include a maximum of 4 high bits in the remaining 900 hits. A receiver with SparseCode capability has a posteriori knowledge of the pertinent preambles.

Training Procedure for Universal Transmitters and Supplementary Receivers

According the present invention making a legitimate copy of a GDO/RKE transmitter can be done by the owner or an authorized person who is given the pertinent identification code, ID-CODE. The ID-CODE is entered via the keypad keys. In a preferred embodiment simultaneous key entries are utilized, i.e., if only four keys are utilized, addition of pressing two keys simultaneously provides 6 addition choices. According to the present invention the only method for another transmitter to be trained (learning the frequency and the code) from a transmitter utilizing SparseCode is by manually entering ID-CODE via the keypad. Variety of devices for different applications can be manufactured to have SparseCode capability, e.g., a regular transmitter, a universal transmitter or a trainable (universal) garage door opener. This is one of the main improvements in the security of a transmitter with SparseCode, i.e., copying of such a code and the frequency by means of a super-heterodyne trainable garage door opener, spectrum analyzers which performs frequency sweeps is not possible.

According to the present invention, the manufacturer supplies to the user an identification code (ID-CODE) which includes both the code and frequency information. This information is entered into the universal remote for instance via only 3 or 4 keys which is the method for making additional copies of a GDO/RKE transmitter.

For instance, if there are 1024 frequencies in the band of interest, the frequency can be entered via only 5 key entries as $(250)_{10}=(3322)_4$. For a bit rate of 10 kbps, and a transmission time of 0.01 second, the total number of bit slots is K=1000. A selection of a SparseCode with a length of 5-8 bits, i.e., L=5 and K=8 would require over 50,000 years to produce all the combinations. To assign bits sparsely with a sufficient separation which would not be identifiable by a super-heterodyne trainable transmitter, the bit slots (K=1000) can be divided into 8 sections of 125 bits wherein in each section there is maximum of one bit possibly present. The location of each bit within the pertinent section is described with four digits which are entered via the 4 keys present on the transmitter. To cover the entire K=1000 bit slots, 4×4=16 entries are necessary.

In a possible scenario, the user first alerts the Trainable Transmitter (TT) by pressing two keys simultaneously (e.g., 1 and 2 keys). After a certain period of time (e.g., 8 seconds) the TT responds by an LED blinks to inform the user that the training mode is initiated. Then the user presses the key which the user intends to utilize after the subsequent training procedure. The LED blinks multiple times (e.g., twice) to inform the user that the button which is selected to be programmed is recognized. The user is supplied with a 20 digit code which contains both the frequency and code information. The digits of the 20 digit code are in the range of 1-4 (In contrast to the commonly used digits in base four, i.e., 0-3). To make the task for the user easier, the twenty digits are separated by dashes (e.g., 32124-11423-33123-21413-43411) as the user enters each group of four digits, the LED blinks once. However, after the entry of the last group of digits the LED blinks multiple times (e.g., 5 times) to indicate the completion of code entry. At any point during the training procedure, if the training is unsuccessful due to delays in entering the digits a long LED blink is followed by a short blink alerts the user of unsuccessful training and the procedure is halted without any changes saved. FIG. 13 depicts a flow chart for training procedure described above. In a preferred embodiment of the present invention, the codes do not reflect a one to one relationship of the location of the bits nor the frequency map. I.e., the digits are scrambled in order to provide a methodology more immune to be investigated/analyzed by hackers.

Figure 14:
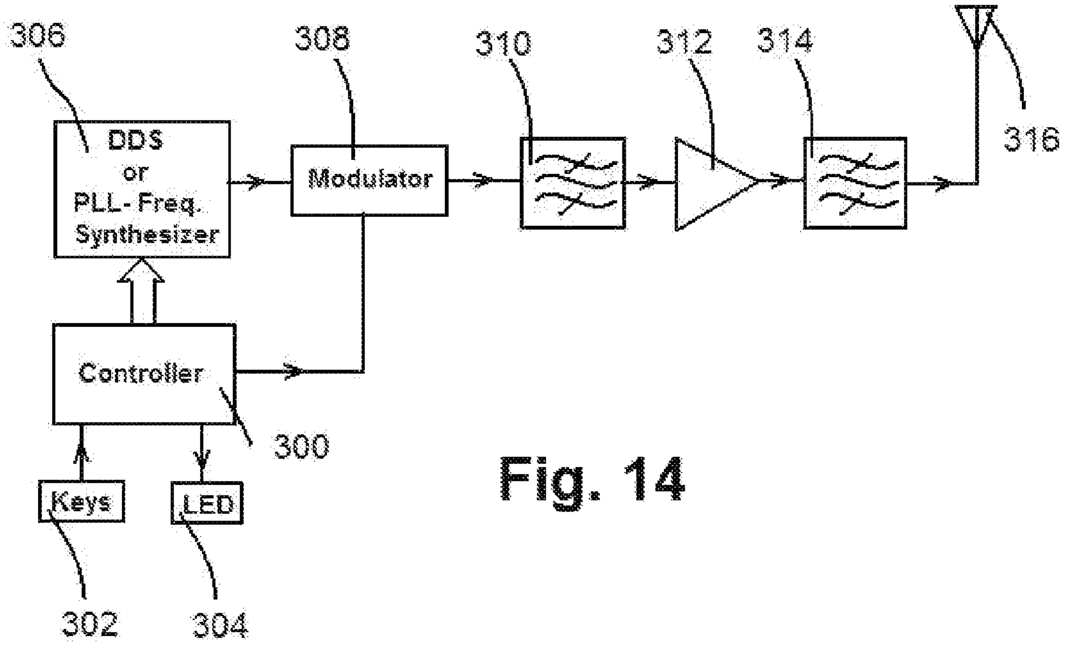
FIG. 14 depicts a flow chart for training procedure of a transmitter with SparseCode capability.

FIG. 14 depicts a block diagram for a transmitter which is capable of producing SparseCode. The SparseCode is programmed via key entry utilizing keys 302 into a controller circuit 300 which provides the feedback to the user via LED 304. Controller circuit 300 could be a micro processor or a micro controller or FPGA or a custom controller. Upon pressing a key the baseband signal is generated by controller circuit 300. SparseCode base band signal is generated by controller 300. The carrier frequency information is provided to an accurate radio frequency generator such as DDS (Direct Digital Synthesis) or PLL (Phase-Locked Loop) frequency synthesizer 306. The advantage of DDS over a PLL is that it would provide sinusoidal signal with amplitude control so the optimum levels with very low harmonic content is generated. The baseband output signal from controller 300 and the output of the signal source 306 are fed to AM modulator 308 which in turn feeds band pass filter 310 feeding amplifier 312 and subsequently bandpass filter 314 and antenna 316 is modulated by the data produced by the micro controller. Band pass filtering is provided to reduce the harmonics before and after the amplification.

Receiver

According to the present invention, the receiver is composed of a processor to handle a SparseCode. In a preferred embodiment of the present invention, a power saving arrangement is utilized. Such arrangement provides a substantial advantage especially, when the supplementary/universal receiver is battery operated.

The transmitter transmits a CW signal at a different frequency ($f_2$) than the operating frequency ($f_1$) which handles the data. The receiver is tuned at the frequency ($f_1$) and is turned on for a small fraction of time. When the auxiliary receiver which is a low power consumption receiver and operates at frequency ($f_1$) receives a signal at its operating frequency, it subsequently turns on the data receiver operating at frequency ($f_2$).

Figure 15:
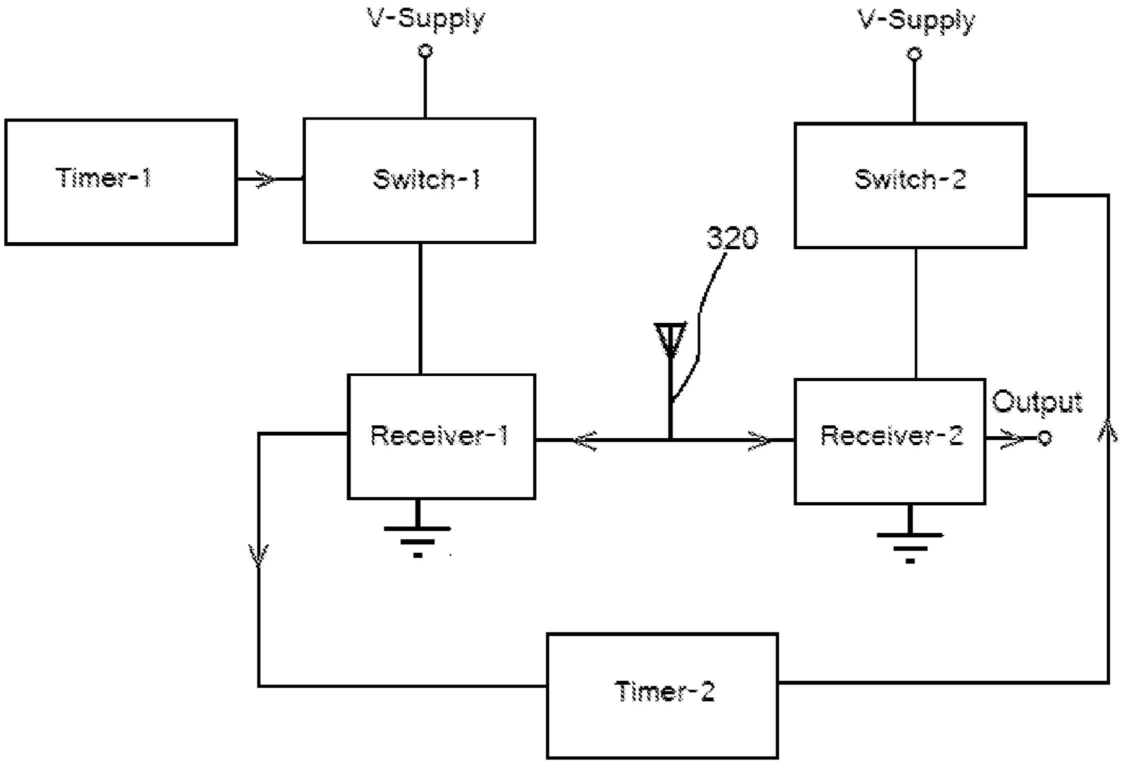
FIG. 15 depicts the block diagram of a receiver with power saving which can be utilized for the present invention to save power and possibly use a battery.

FIG. 15 depicts a receiver with power saving receiver wherein Receiver-2 represents any type of receiver, i.e., SparseCode, rolling code or fixed code. In the absence of any receive signals, Receiver-2 is in sleep mode, i.e., Switch-2 is disconnected and the receiver does not take any power from the power supply. Timer-1, is a clock circuit that provides a high signal only a small percentage of time, e.g., 2%. The output of Timer-1 is connected to Switch-1. Each of the switches, i.e., Switch-1 and Switch-2 can be implemented by a transistor switch such as a FET. Switch-1 provides the power supply connection to Receiver-1 when it is enabled. Switch-2 provides the power supply connection to Receiver-2 when it is enabled. In order to save power, Timer-1 is turned on only a small percentage of time enabling Receiver-1 for a small percentage of time. During the time which Timer-1 turns on, Switch-1 is enabled and as a result Receiver-1 is temporarily turned on and antenna 320 receives the signal frequency ($f_1$) which in turn feeds Receiver-1 as a result of reception of a signal at frequency ($f_1$), Receiver-1 produces a high signal, turning on Tinier-2, upon which Timer-2 stays on for a period of time sufficient for reception and detection of signal by Receiver-2 received via antenna 320 from the pertinent Transmitter. The transmitter transmits a CW signal at a different frequency ($f_1$) than the operating frequency ($f_2$) which handles the data. The receiver is tuned at the frequency ($f_1$) and is turned on for a small fraction of time. Upon reception of signal at frequency ($f_1$) when timer 1 is on, Receiver-1 provides a high signal to Timer-2 which enables Switch-2 temporarily sufficient for receiver-2 to receive and detect data and provide a high signal output for activation of the pertinent opening/closing mechanism.

When the transmitter is a SparseCode of the type described in FIG. 14 or similar wherein a frequency synthesizer, the same transmitter can potentially be used for generating both frequencies $f_1$ and $f_2$.

In another preferred embodiment of the present invention, the receiver is capable of receiving a master codes from a remote transmitter. This allows external programming for deactivating an old code or activating a new code. This requires a programmer module which is composed of a transmitter which transmits an activation master code followed by a code which needs to be activated and transmits a deactivation master code followed by a code which needs to be deactivated.

Supplementary Receiver

The described receiver according to the present invention can function as a standalone receiver or in parallel with an existing receiver or a plurality of receivers. In such an arrangement, the receivers can function independent of each other since the receivers outputs are contact closures and are connected which are in parallel. To avoid climbing on a ladder for installation of the "supplementary receiver" the output ports of the receiver can be wired to the wall garage door opening switch which is electrically the same point as the contact closures. The supplementary receiver coding and frequency maps can be provided to the universal garage door opener manufacturers for utilizing theme in their universal transmitters. This by no means poses any security compromises to the users as the only way to program a universal transmitter is by entering the "training code" which is only known by the user.

What is claimed is:

1. A garage door/gate opening/closing mechanism, for activation of a wall switch, said mechanism comprising:

a universal supplementary receiver housing having at least one electromechanical actuator configured to exert a mechanical force on a button/or buttons of said wall switch in order to actuate a garage door, wherein said electromechanical actuator is actuated by means of an electrical signal produced by a radio frequency receiver or by means of a switch, wherein said supplementary receiver housing having a plurality of blade members located on the periphery of an opening of said housing, said opening configured to be placed over said wall switch; and a rotating element accessible to a user on an outside of said supplementary receiver housing, wherein said plurality of blade members are configured to be moved from a first unlocked position to a second locked position onto said wall switch via said rotating element.

2. The garage door/gate opening/closing mechanism according to claim 1 wherein the receiver operates with fixed codes.

3. The garage door/gate opening/closing mechanism according to claim 1 wherein the receiver operates with rolling codes.

4. The garage door/gate opening/closing mechanism according to claim 1 wherein the receiver operates with SparseCode.

* * * * *